(12) United States Patent
Ward et al.

(10) Patent No.: US 6,305,583 B1
(45) Date of Patent: Oct. 23, 2001

(54) VALVE FOR VISCOUS FLUID APPLICATOR

(75) Inventors: James R. Ward, Milwaukee; Thomas J. Stobbs, Brookfield, both of WI (US)

(73) Assignee: TLX Technologies, Waukesha, WI (US)

( * ) Notice: Subject to any disclaimer, the term of this patent is extended or adjusted under 35 U.S.C. 154(b) by 0 days.

(21) Appl. No.: 09/502,681

(22) Filed: Feb. 11, 2000

(51) Int. Cl.⁷ .............................. B67D 5/06; F16K 31/06
(52) U.S. Cl. ............... 222/504; 251/129.07; 251/129.15; 251/129.18; 335/227; 335/279
(58) Field of Search ................... 222/1, 504, 518; 251/129.07, 129.15, 129.16, 129.18; 239/585.1, 585.3, 585.4, 585.5; 335/227, 236, 237, 279

(56) References Cited

U.S. PATENT DOCUMENTS

| | | |
|---|---|---|
| 4,488,665 | 12/1984 | Cocks et al. . |
| 5,110,087 | * 5/1992 | Studtmann et al. ............. 251/129.16 |
| 5,156,341 | * 10/1992 | Terakado et al. .................. 239/585.4 |
| 5,392,995 | * 2/1995 | Wahba ............................... 239/585.4 |
| 5,647,387 | * 7/1997 | Tsutsui ........................ 251/129.05 X |
| 5,749,527 | * 5/1998 | Fujikawa et al. ........... 251/129.16 X |
| 5,769,328 | * 6/1998 | Zdyb et al. .................. 251/129.18 X |
| 5,875,922 | 3/1999 | Chastine et al. . |
| 5,915,591 | 6/1999 | Erickson et al. . |
| 5,934,520 | 8/1999 | Byerly et al. . |

* cited by examiner

Primary Examiner—Kevin Shaver
Assistant Examiner—Eric Keasel
(74) Attorney, Agent, or Firm—Reinhard, Boerner, Van Deuren, Norris & Rieselbach, s.c.

(57) ABSTRACT

A valve for dispensing a viscous fluid, includes a valve body defining a fluid chamber and a stepped armature within the fluid chamber. The armature has a large diameter portion maintained spaced apart from an inner surface of the valve body, defining a first air gap therebetween, and a second, smaller diameter portion which engages an inner surface of the valve body, supporting the armature within the valve body and defining a second lower reluctance air gap. A solenoid coil energized by a peak and hold drive current produces an electromagnetic field for moving the armature relative to the magnetic pole piece and the valve body. The second portion of the armature becomes magnetically saturated during the peak portion of the drive current, causing magnetic flux to be diverted through the first portion of the armature. The second portion of the armature comes out of saturation during the hold portion of the drive current, allowing a portion of the magnetic flux to be passed through the lower reluctance air gap.

23 Claims, 8 Drawing Sheets

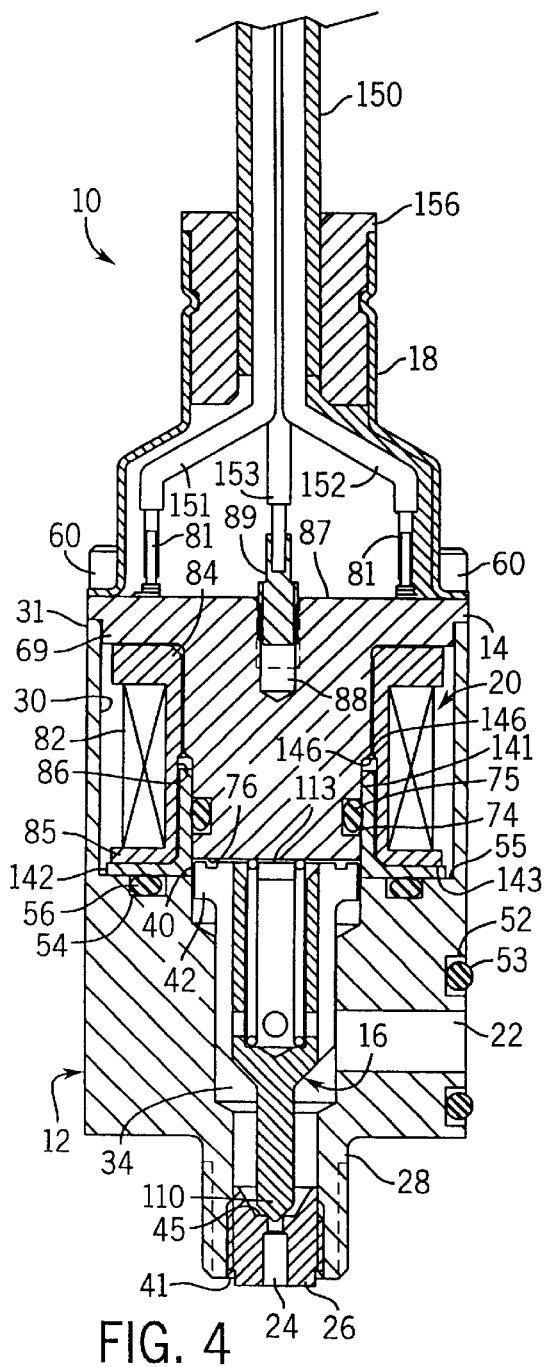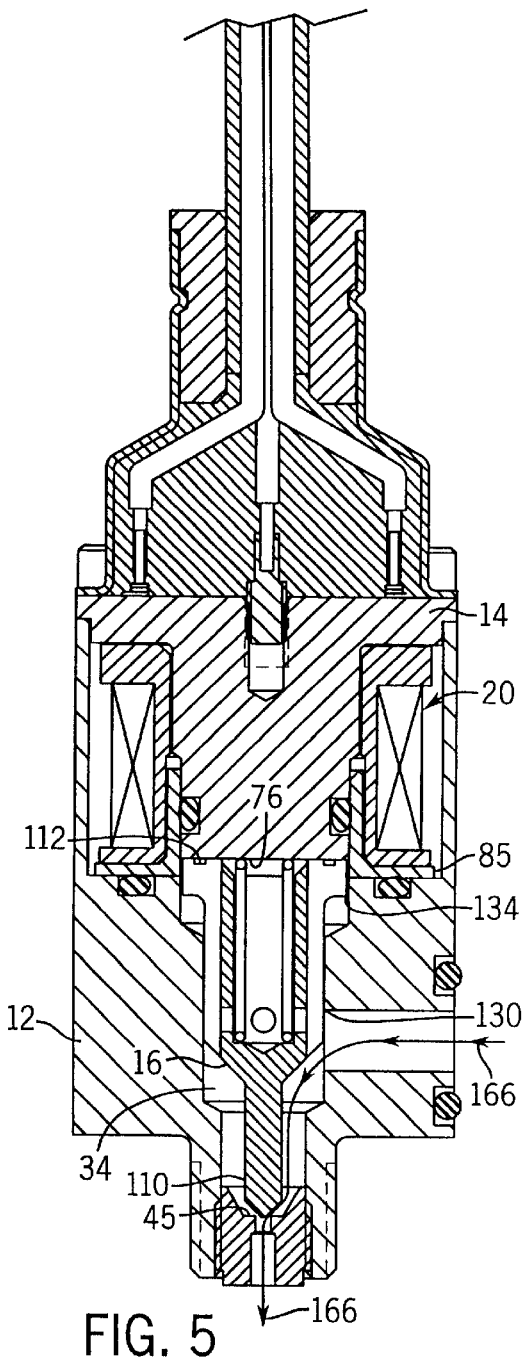
FIG. 4
FIG. 5

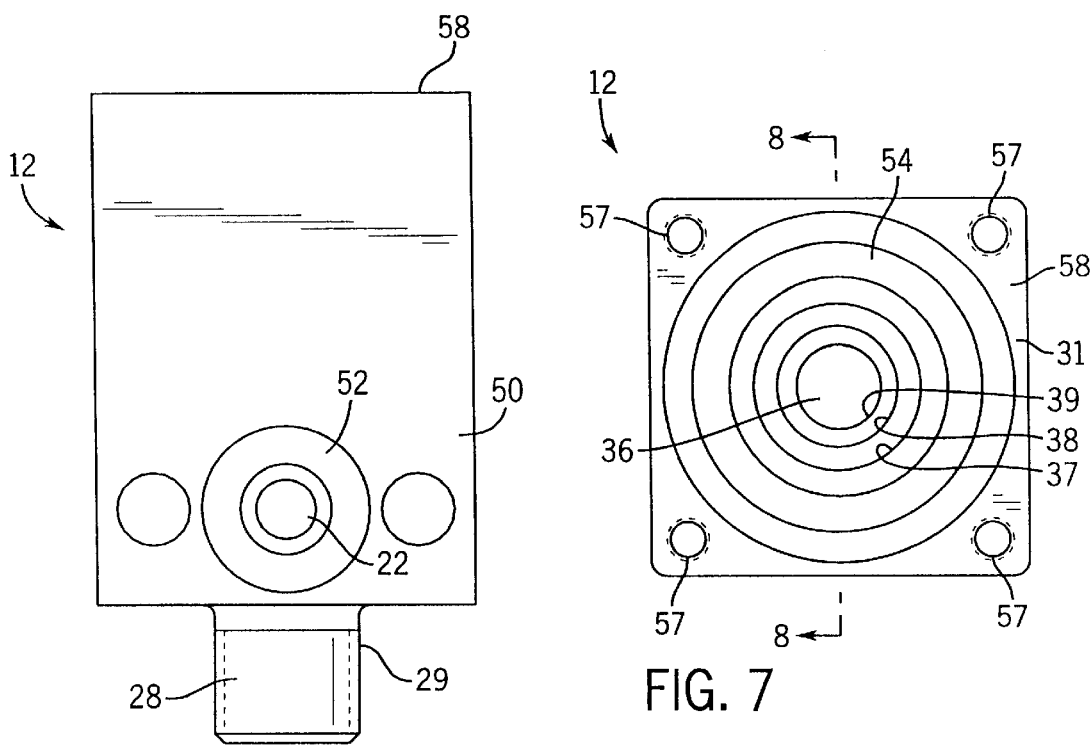
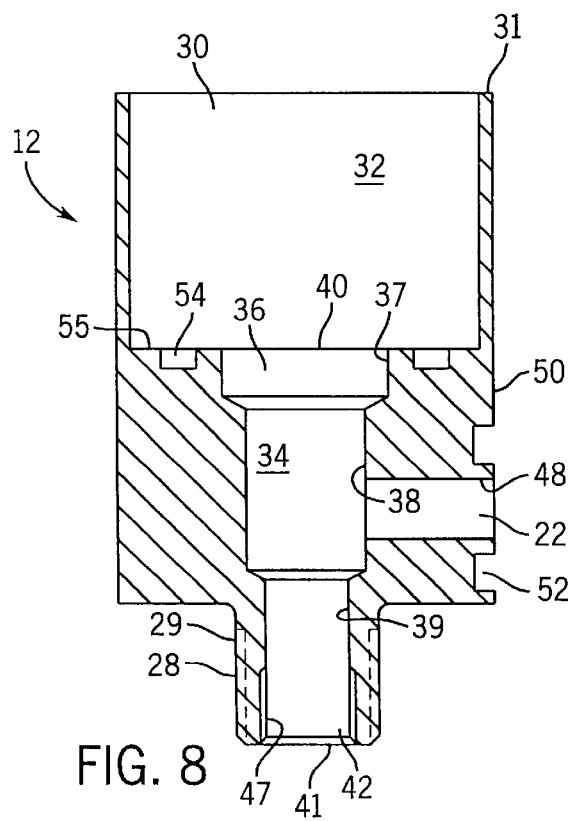

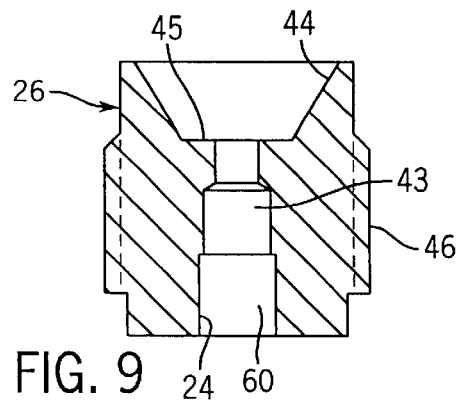
FIG. 9
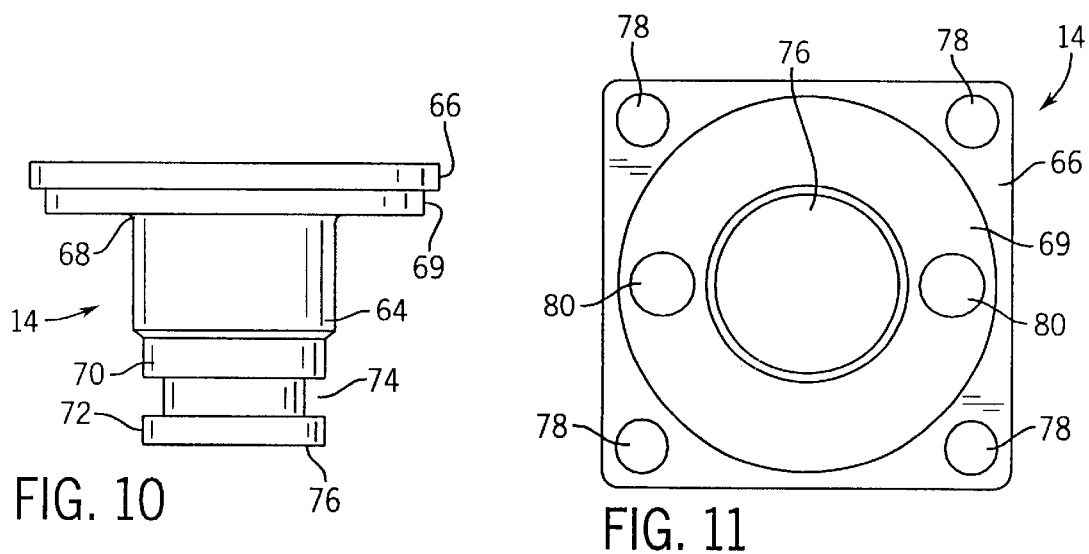
FIG. 10
FIG. 11
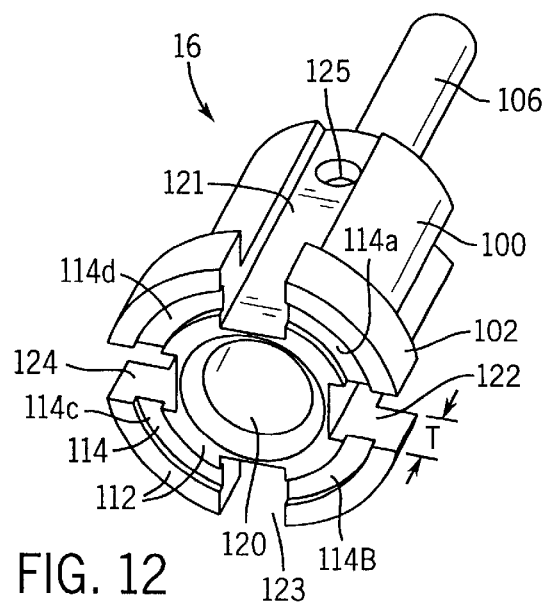
FIG. 12

VALVE FOR VISCOUS FLUID APPLICATOR

BACKGROUND OF THE INVENTION

Field of the Invention

The present invention relates generally to a valve for viscous fluid applicators.

Many packaging applications require the application of adhesive to flaps for sealing packages. In some cases in which a liquid adhesive or glue is used, valves are used to dispense the glue for application to the packages being sealed.

One dispenser for use in dispensing viscous fluids, such as hot melt adhesives, is disclosed in U.S. Pat. No. 5,875,922. The dispenser includes an armature mounted within a fluid chamber for reciprocating motion relative to a pole member. The armature is adapted to permit the hot melt adhesive to flow through and around the armature as the armature is moved towards the pole member.

However, the interface between the armature and the pole piece is located near the center of the solenoid coil. Consequently, the fluid chamber extends within the interior of the solenoid, and a portion of the armature extends half the length of the solenoid coil. The additional length required for the armature, results in increased mass for the armature. Moreover, fluid flow paths through and around the armature are lengthened. Moreover, sealing between the fluid chamber and the solenoid coil must be provided around coextensive portions of the solenoid coil and the armature.

Thus, the dispenser includes an elongated tube which is interposed between the armature and the dispenser body to provide sealing for the fluid chamber. The sealing tube is made of a heat resistant, non-magnetic material, such as stainless steel. The sealing tube produces a long air gap between the armature and the valve body, with the sealing tube located in the air gap substantially the entire length of the armature. Consequently, the magnetic force used to drive the armature must be large enough to compensate for the losses due to the presence of non-magnetic sleeve in the air gap.

A further consideration is that viscous fluid dispensers of this type preferably must be adapted to permit adjustment in the stroke of the armature due to allow some leeway in manufacturing tolerances. In the dispenser disclosed in the '922 Patent referenced above, the gap between the armature and the pole piece is adjusted by turning the pole piece which is threaded into the body.

SUMMARY OF THE INVENTION

The disadvantages and limitations of the background art discussed above are overcome by the present invention. With this invention, there is provided a valve for intermittently dispensing a viscous fluid. The valve includes a valve body defining a fluid chamber having a fluid outlet and a fluid inlet for communicating the fluid chamber with a source of the viscous fluid. The valve includes a pole piece which closes the fluid chamber at one end, and an armature disposed within the fluid chamber for reciprocating movement between first and second positions. The armature prevents fluid flow through the fluid outlet when the armature is in one of the positions, and the armature permits fluid flow through the fluid outlet when the armature is moved away from that position. The valve further includes a solenoid coil for producing an electromagnetic field in a magnetic circuit which includes the valve body, the pole piece and the armature, for moving the armature from the first position to the second position. The armature cooperates with the valve body to define at least first and second air gaps and is configured and arranged to cause at least a portion of the magnetic flux to be diverted from one of the air gaps to the other gap during at least a portion of each operating cycle.

A first large diameter portion of the armature is spaced apart from an inner surface of the axial bore along a first portion thereof, and a second portion of the armature engages a further inner surface of the axial bore along a second portion thereof. The second portion of the armature supports the armature for axial movement within the axial bore. At least a portion of the magnetic flux through the second portion of the armature is diverted through the first portion of the armature during an initial portion of each operating cycle.

In one embodiment, magnetic flux passing through the first air gap produces a magnetic force for moving the armature from the first position to the second position. Magnetic flux passing through the second air gap provides a holding force for maintaining the armature at the second position. The first and second air gaps are located along the axial extent of the armature. The first air gap provides a reluctance that is greater than the reluctance provided by the second air gap.

In accordance with a further aspect of the invention, the valve includes a sealing structure for sealing one end of the fluid chamber. The sealing structure includes an isolation sleeve having an axially extending portion and a radially extending portion. The axially extending portion is interposed between the solenoid coil and one end of the pole piece. The radially extending portion is interposed between an inner surface of the body and the first end of the armature.

Further in accordance with the invention, the nozzle is adjustably mounted in the fluid outlet for allowing adjustment of the stroke of the armature, independent of manufacturing tolerances.

DESCRIPTION OF THE DRAWINGS

These and other advantages of the present invention are best understood with reference to the drawings, in which:

FIG. 4 is a vertical section view taken along the line 4—4 of FIG. 2, and with the valve shown in the closed condition;

FIG. 5 is a view similar to that of FIG. 4 and with the valve shown in the open condition;

FIG. 6 is an elevation view of a body of the valve of FIG. 1;

FIG. 7 is a top end view of the valve body of FIG. 6;

FIG. 8 is a section view taken along the line 8—8 of FIG. 7;

FIG. 9 is a vertical section view of a valve seat of the valve of FIG. 1;

FIG. 10 is an elevation view of a pole piece of the valve of FIG. 1;

FIG. 11 is a bottom end view of the pole piece of FIG. 10;

FIG. 12 is an isometric view of an armature of the valve of FIG. 1;

DETAILED DESCRIPTION OF THE PREFERRED EMBODIMENTS

Figure 1:
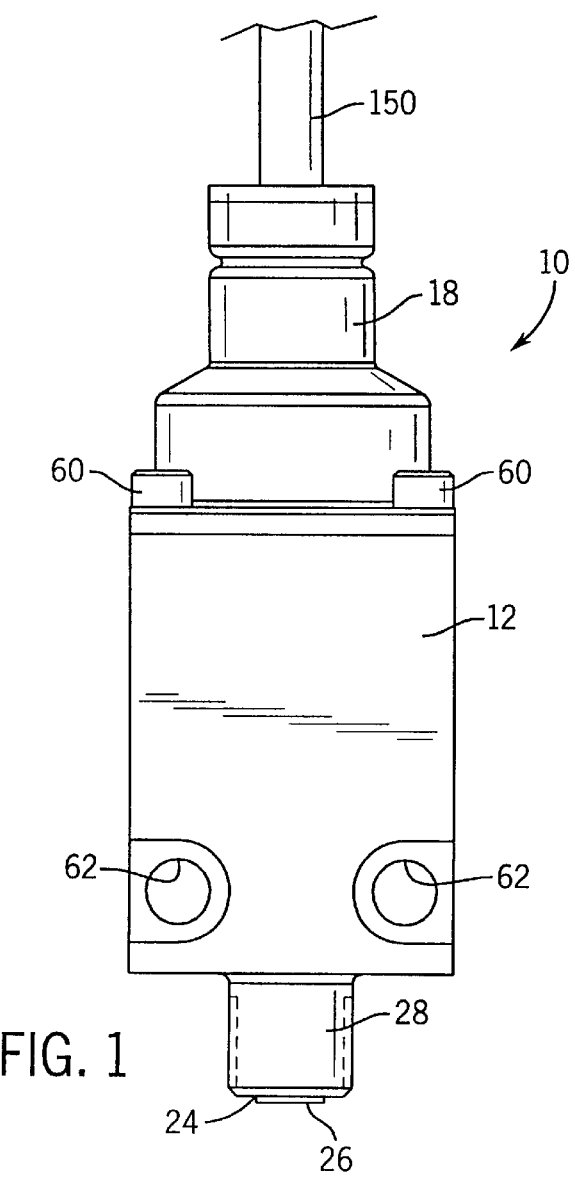
FIG. 1 is a side elevation view of a valve provided by the invention.
Figure 2:
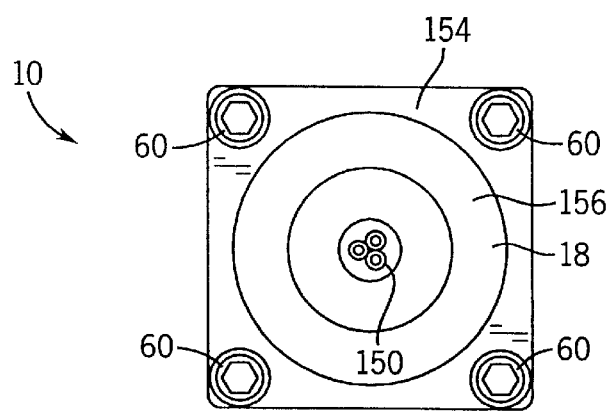
FIG. 2 is a top end view of the valve of FIG. 1.

Referring to FIGS. 1–4 of the drawings, a preferred embodiment of an electromagnetically operated valve for dispensing viscous fluids in accordance with the invention is indicated generally by the reference numeral 10. The valve 10 includes a valve body 12, a magnetic pole piece 14, an armature 16 and a solenoid coil 20 for positioning the armature 16 relative to the magnetic pole piece 14 and the valve body 12. The valve 10 includes a fitting 18 which encloses the pole piece 14 and the lead connections to the solenoid coil 20. The valve has a valve inlet 22 and a valve outlet 24 including a valve seat member 26.

The valve 10 is described with reference to an application for viscous fluid flow applications, such as for dispensing liquid adhesives such as hot melt adhesives and the like. Typically, in such applications, the hot melt adhesive is dispensed intermittently. However, the valve 10 can be used in applications for dispensing other fluids, including heated or non-heated fluids. For purposes of illustration, the valve 10 is shown oriented vertically with the valve outlet 24 located at the bottom. While directions and orientations are used herein for illustrative purposes, it will be apparent that the present invention can operate effectively in any desired direction or orientation.

Considering the valve 10 in more detail, with reference to FIGS. 1, 3, 4 and 6–8, the valve body 12 is generally rectangular in shape and has a cylindrical reduced diameter portion 28 at its lower end 29. The upper half of the valve body has a large, generally cylindrical bore 30 extending to its upper end 31, defining a compartment 32 in which the pole piece 14 and the solenoid coil 20 are mounted. The lower half of the valve body 12 includes a stepped axial bore 36 which defines a fluid chamber 34 through is which viscous fluid is transferred from the valve inlet 22 to the valve outlet 24. The fluid chamber has an upper end 40 and a lower end 41. The axial bore 36 is communicated with the compartment 32 at the upper end 40 of the fluid chamber 34 and extends through the reduced diameter portion 28 of the valve body 12. The axial bore 36 defines coaxial bore portions 37, 38 and 39 within the valve body 12. The transition between bore portions 37 and 38 and the transition between bore portions 38 and 39 are tapered to eliminate abrupt steps in the inner wall surface of the axial bore 36. The valve body 12 can be made of steel or any other suitable magnetic material.

The bore portion 39 at the lower end 41 of the fluid chamber 34 defines a valve outlet opening 42 in which is mounted the valve seat member 26. Referring also to FIG. 9, the valve seat member 26 is generally cylindrical in shape and has a stepped bore 43 therethrough. The bore 43 defines the fluid outlet 24 for the valve 10. The inlet end 44 of the valve seat member 26 is flared, defining a valve seat 45. The bore 43 increases in diameter from the valve seat 45 towards the fluid outlet 24. The valve seat member 26 includes threads 46 on its outer surface which mate with complementary threads 47 on a portion of the inner surface of the bore portion 39. The position of the valve seat member 26 is adjustable axially, by rotating the valve seat member 26 within the bore portion 39 to accurately set the length of travel of the armature 16, independent of manufacturing tolerances.

The valve body 12 has a radial bore 48 through one side 50 thereof and which is communicated with the fluid chamber 34, defining the valve inlet 22. An annular groove 52 extends around the bore 48 in the side 50 and contains a sealing member 53, such as an O-ring. The valve body 12 has a further annular groove 54 in its end surface 55 which defines the inner wall of the compartment 32. The surface 55 contains a further sealing member 56, such as an O-ring.

In one embodiment, the valve body 12 is adapted to have the pole piece 14 mounted directly to the valve body 12. The valve body 12 can include a plurality of mounting holes, such as four tapped holes 57, in its upper surface 58 which receive mounting bolts 60 that secure the pole piece 14 and the fitting 18 to the valve body 12. The valve 12 body can have one or more bolt holes 62 in one side 63 of the valve body 12 to facilitate mounting the valve 10 to packaging apparatus, or any other type of equipment, with which the valve 10 is used for dispensing a viscous fluid.

Referring to FIGS. 3, 4 and 10–11, the pole piece 14 is a solid, one-piece element which includes a generally cylindrical main body portion 64, and an outer, rectangular mounting flange 66 at its upper end 68. The flange 66 corresponds in shape and size to the upper end 31 of the valve body 12 to allow the pole piece 14 to be mounted on and secured to the upper end 31 of body 12. The pole piece 14 further includes a large diameter circular portion 69 which depends from the lower surface of the flange 66 and is received in the bore 30 of the body 12, as shown in FIG. 4. The outer diameter of the portion 69 is slightly smaller than the inner diameter of the bore 30 in the valve body 12. The cylindrical main body portion 64 of the pole piece 12 has a reduced diameter portion 70 near its lower end 72. The reduced diameter portion 70 includes a circumferential groove 74 which contains a sealing member 75, such as an o-ring. The pole piece 14 can be made of steel or any other suitable magnetic material.

The main body portion 64 of the pole piece 14 is dimensioned to allow the solenoid coil 20 to be mounted on the main body portion 64 of the pole piece 14. The solenoid coil 20 includes a winding 82 which is wound on a bobbin 84. The bobbin 84 has an opening 86 the inner diameter of which is approximately the same as the outer diameter of the cylindrical portion 64 of the pole piece 14.

The pole piece 14 is mounted in compartment 32 of the valve body 12 and closes the upper end 40 of the fluid chamber 34. The lower surface 76 of the pole piece 14 defines a circular pole face which is located at the upper end 40 of the fluid chamber 34. The pole face 70 is located near the lower end 85 of the solenoid coil bobbin 84.

The mounting flange 66 includes a plurality of bolt holes 78 through which pass the bolts 60 (FIG. 4) for securing the pole piece 14 to the valve body 12. The flange 66 further includes a plurality of holes 80 through which pass the terminals 81 of the solenoid coil. The upper surface 87 of the pole piece 14 has a blind hole 88 for receiving a terminal 89 for making a ground connection to the valve body 12 allowing grounding of the valve as is known.

Referring to FIGS. 3, 4 and 12–15, the armature 16 is elongated, generally cylindrical in shape. The armature 16 is stepped and includes a large diameter portion 102 at the upper end 104, an intermediate diameter main body portion 100, and a reduced diameter portion 106 at the lower end 108 of the armature. The lower end of the reduced diameter portion 106 tapers, defining a valve member 110 for the valve 10.

The outer diameter of the main body portion 100 of the armature is approximately the same as the inner diameter of intermediate portion 38 of the stepped bore 32 through the valve body 12. The outer diameter of the large diameter portion 102 of the armature 16 is smaller than the inner diameter of the coaxial bore portion 37 of the stepped bore 32 of the valve body 12. Thus, the armature 16 includes large diameter portion 102 having a first cross sectional area and intermediate diameter portion 100 which has a cross sectional area that is smaller than the cross sectional area of the larger diameter portion. The surface, or armature face 112 of the large diameter portion 102 is located in opposing relation with the pole face 76. The larger upper end portion 102 of the armature 16 allows a high magnetic attractive force to be produced between the pole piece 14 and the armature 16. The armature 16 can be made of steel or any other suitable magnetic material.

The main body portion 100 of the armature 16 supports the armature 16 within the fluid chamber of the valve body 12 for reciprocating movement between closed and open positions. In the closed position, shown in FIG. 4, the valve member 110 engages the valve seat 45, preventing fluid flow out of the valve 10. In the open position, shown in FIG. 5, the valve member 110 is moved out of engagement with the valve seat 45, permitting fluid to flow past the armature and out of the valve through the valve outlet 24 as indicated by the arrows 166 in FIG. 5. As is known, substantially the entire fluid chamber 34 is normally filled with the hot adhesive, including the regions in and around the armature. In the closed or flow preventing position, the armature face 112 is spaced apart from the pole face 76, providing an air gap 113 therebetween. In the open or flow permitting position, the armature face 112 engages the pole face 76. The outer surface of the valve member 110 can be hardened for wear resistance while the interior armature material is kept soft for magnetic conduction.

Figure 17:
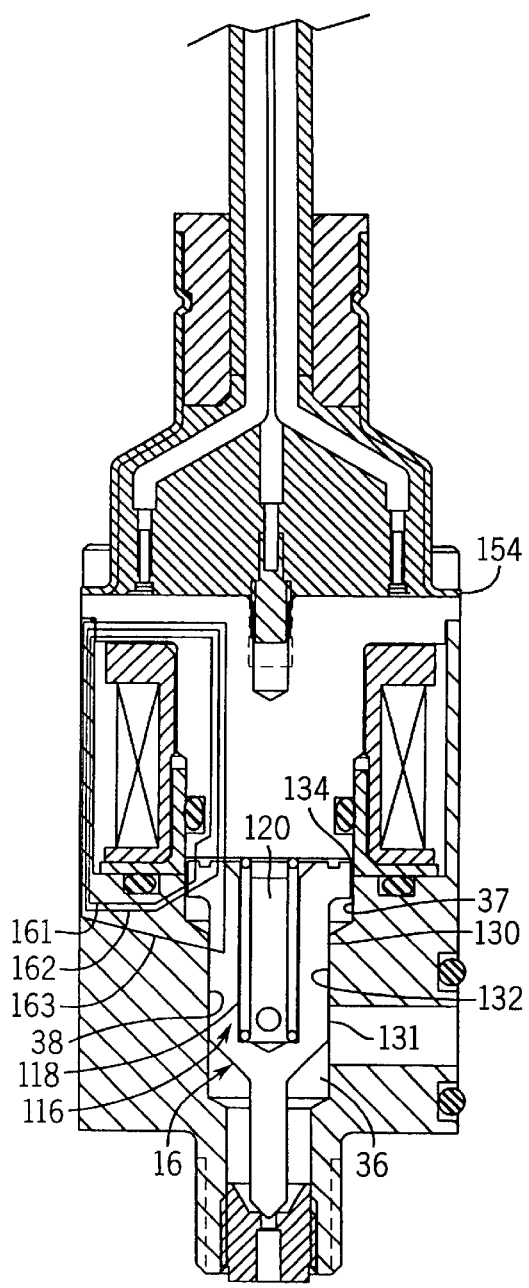
FIG. 17 is a vertical section view of the valve, and showing paths for magnetic flux lines for the closed condition of the valve.

Referring also to FIG. 17, the intermediate diameter main body portion 100 of the armature 16 maintains contact with the intermediate portion 38 of the stepped bore 36 and acts as a bearing surface between the outer surface 131 of the armature and the inner surface 132 of bore portion 38 of the valve body 12. Although a small radial air gap 130 can exist between the outer surface 131 of the armature and the inner surface 132 of the valve body, the air gap 130 is on the order of 0.002". The larger diameter portion 102 of the armature is maintained spaced apart from the inner surface of the bore, providing an air gap 134 which is larger than the air gap 130. In one embodiment, the air gap 134 is about 0.006". The fixed air gap 134 is maintained by the contact between surface 131 of the intermediate diameter portion 100 of the armature 16 and the surface 132 of the intermediate portion 38 of the stepped bore 36, and the relative sizes of the outer diameter of armature portion 102 and the inner diameter of the bore portion 37. The stepped armature 16 provides flux paths for the electromagnetic flux generated by the solenoid coil 20 when it is energized, there being differing series air gaps 130 and 134 in the flux paths. The air gaps 130 and 134 are a factor in establishing the operating time for the valve 10.

The valve 10 includes a bias structure 116 which biases the armature 16 toward the closed or flow preventing position. In one embodiment, the bias structure includes a compression spring 118 which is located in an axial bore 120 in the armature 16, interposed between the pole face 76 and the inner end 119 of the axial bore 120. In one embodiment, the axial bore 120 extends through both the upper end portion 102 and the main body portion 100 of the armature 16.

In one embodiment, the armature surface 112 includes an annular, tree pan groove 114, which is segmented into four portions 114a–114d. The groove 114 interrupts the armature face 112 to minimize the effects of surface tension due to the presence of adhesive between the pole face 76 and the armature face 112. As is known, the presence of a viscous fluid, such as hot melt adhesive, between engaging surfaces, such as the pole face 76 and the armature face 112, can result in surface tension which tends to prevent the components from separating. Such surface tension can be a factor in reducing the response time for the valve 10. Interrupting one of the surfaces, such as the armature face 112, allows substantially the same magnetic attractive force to be produced while reducing the affects of surface tension.

Preferably, the armature 16 includes a plurality of grooves or flow channels which extend along the outer surface of the upper end portion 102 and the main body portion 100 of the armature. In one embodiment, the armature 16 includes four axially extending flow channels 121–124 which are spaced apart equidistantly about the periphery of the armature. The axial flow channels 121–124 are generally rectangular in cross section. The axial flow channels provide passageways which allow the adhesive to flow around the armature, along the outer surface of the armature from areas, such as the area between the pole face 76 and the armature face 112, toward the valve outlet 24 when the armature 16 is moved toward the pole face 76 under the influence of the electromagnetic field generated by the solenoid coil 20 when it is energized. The depth of the axial flow channels 121–124 is maximized so as to increase flow and reduce resistance while leaving sufficient ferrous steel as not to degrade magnetic performance of the valve.

The armature 16 can include a plurality of cross drilled holes, such as cross drilled 125–128 which are aligned with and in fluid communication with the flow channels 121–124 to communicate the flow of viscous fluid to and from the fluid chamber. This allows adhesive trapped between the opposing surfaces 112 and 76 of the armature 16 and the pole piece 14 to be flowed through the armature in the passageway provided by the axial bore 120 in the armature and out the cross drilled holes 125–128 toward the outlet orifice 26.

The interface between the armature face 112 and the pole face 76 is located as close as possible to the lower end 85 of solenoid coil 20. This allows the length of the armature 16 to be minimized which reduces the mass of the armature and also reduces the length of the fluid flow paths around the armature provided by fluid flow channels 121–124 and the fluid flow paths through the armature provided by the axial bore 120 and the cross-drilled holes 125–128. Moreover, the thickness T of the large diameter section 102 is minimized to further reduce the total mass of the armature.

Both the mass of the armature 16 and the length of the flow paths are a factor in determining the response time for the valve 10. Reduction in the mass of the armature provides faster on and off response times for the valve 10. In addition, the reduction in mass of the armature 16 results in less wear due to lower momentum and impact loading between the tip 110 the armature and the valve seat 45. The shorter armature 16 decreases the length of the axial flow paths or channels used to transfer displaced fluid when the armature 16 is translated between states. By shortening these flow channels, the resistance to movement caused by viscous fluid moving through these channels is reduced.

Figure 3:
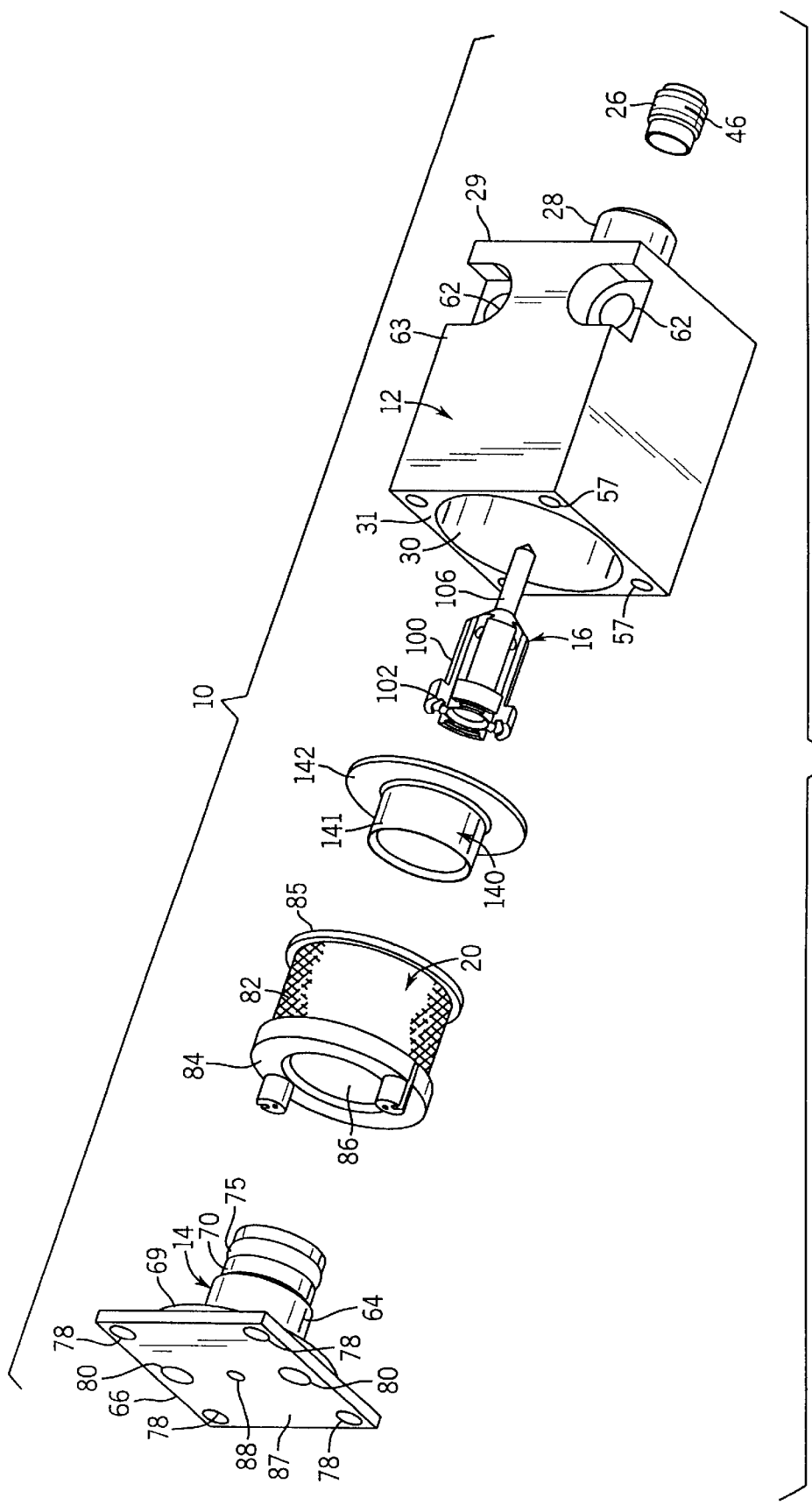
FIG. 3 is an exploded view of the valve of FIG. 1.
Figure 14:
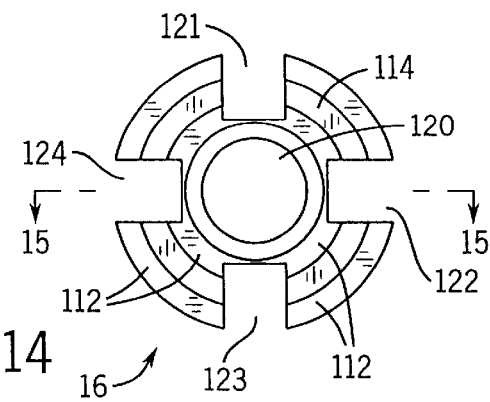
FIG. 14 is a bottom end view of the armature of FIG. 10.
Figure 13:
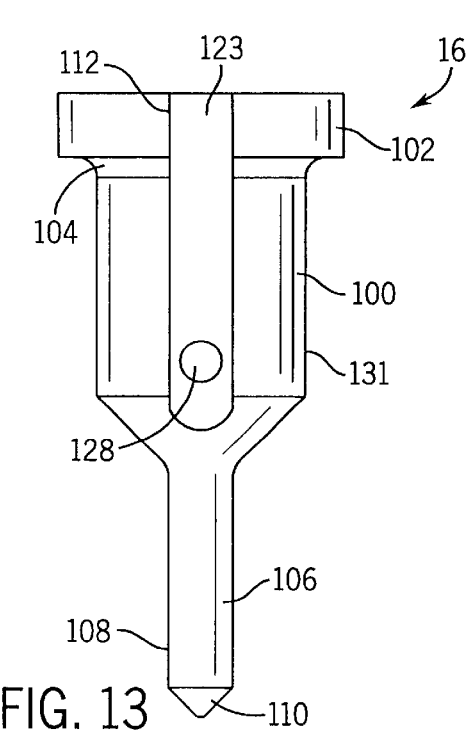
FIG. 13 is an elevation view of the armature of FIG. 12.
Figure 15:
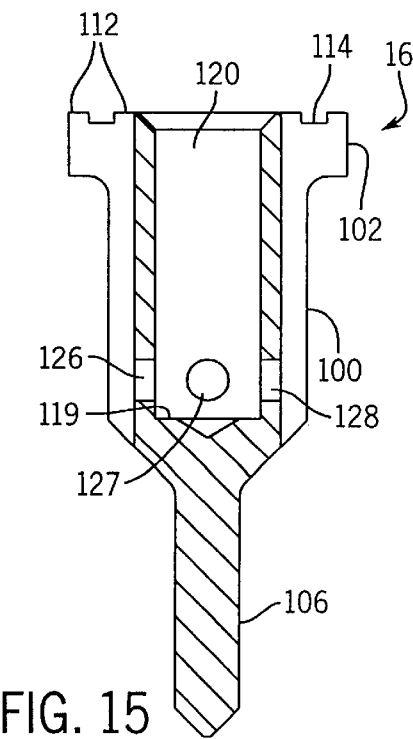
FIG. 15 is a section view taken along the line 15—15 of FIG. 14.
Figure 16:
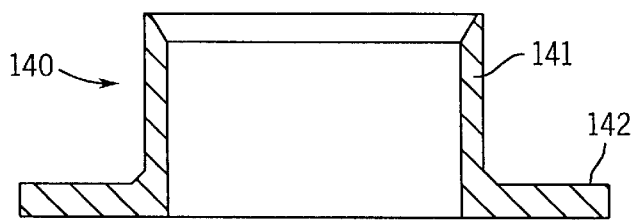
FIG. 16 is a vertical section view of an isolation sleeve of the valve of FIG. 1.

Referring to FIGS. 3, 4 and 16, the valve 10 includes an isolation sleeve 140 for sealing the fluid chamber 34 at its upper end 40 to provide a sealed fluid chamber 34 for the adhesive being dispensed by the valve 10. In one embodiment, the sleeve 140 is of a non-magnetic material.

The sleeve 140 includes a tubular portion 141, which is interposed between the opposing surfaces of the bobbin 84 and the pole piece 14, and a flange portion 142 which is interposed between the opposing surfaces of the bobbin 84 and the valve body 12. The annular sealing member 56, which is located in the annular groove 54 in surface 55 of the valve body 12, together with the flange portion 142 of the isolation sleeve 140, provide sealing between the surface 55 of the valve body 12 and the opposing surface 143 of the bobbin 84. Similarly, the annular sealing member 75, which is located in the circumferential groove 74 in the magnetic pole piece 14, together with the tubular portion 141 of the isolation sleeve 140, provide sealing between the surface 144 of the pole piece and the opposing surface 146 of the of the bobbin 84.

The sealing structure, including the isolation sleeve 140, and sealing members 56 and 75 cooperate with the valve body 12 and the pole piece 14 to close and seal the upper end 40 of the fluid chamber 34, preventing the viscous fluid from being forced out the valve 10 through any openings except the valve outlet 26. Moreover, the sealing structure, particularly the isolation sleeve, does not extend into the air gaps 130 and 134 (FIG. 17) that contribute to defining the operating time for the valve 10. In addition, because the isolation sleeve is of a non-magnetic material, such sealing is provided without locating a element of a non-magnetic, heat resistant material in the air gaps which would interrupt the magnetic flux paths.

Referring to FIGS. 1 and 4, a multi-lead cable 150 provides connections to the solenoid coil 20. The cable 150 includes a pair of leads 151 and 152 which connect to terminals of the winding 72. A further lead 153 is connected to terminal 89 mounted in the blind hole 88 in the pole piece 14, providing a ground connection to the metal portion of the valve 10. The cable leads 151–153 are soldered or otherwise connected to the lead terminals.

The fitting 18 is adapted for mounting on the pole piece 14. The fitting 18 includes a rectangular mounting flange 154 which includes four mounting holes (not shown) through which extend the mounting bolts 60 which also pass through the mounting holes 78 in the pole piece 14 and are threaded into mounting holes 57 in the valve body 12. The fitting 18 is a cover which encloses connections and supports a low thermal conductivity insulator 156 which is mounted in the fitting 18. The insulator 156 insulates the cable 150 from the fitting 18 and acts as a mechanical strain relief for the cable 150.

Figure 18:
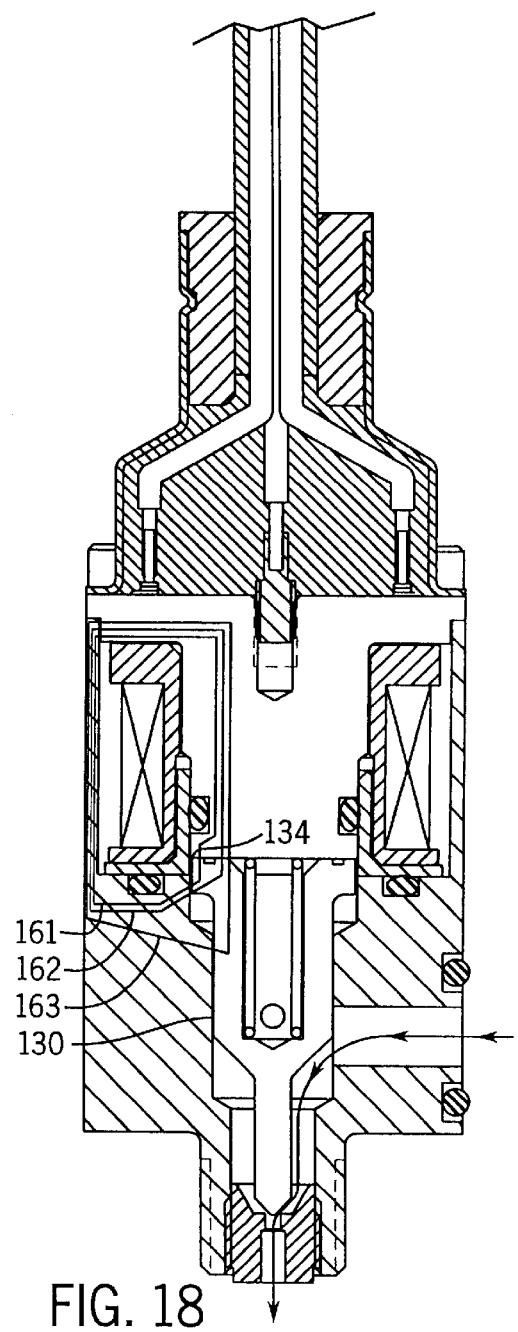
FIG. 18 is a vertical section view of the valve, and showing paths for magnetic flux lines for the open condition of the valve.
Figure 19:
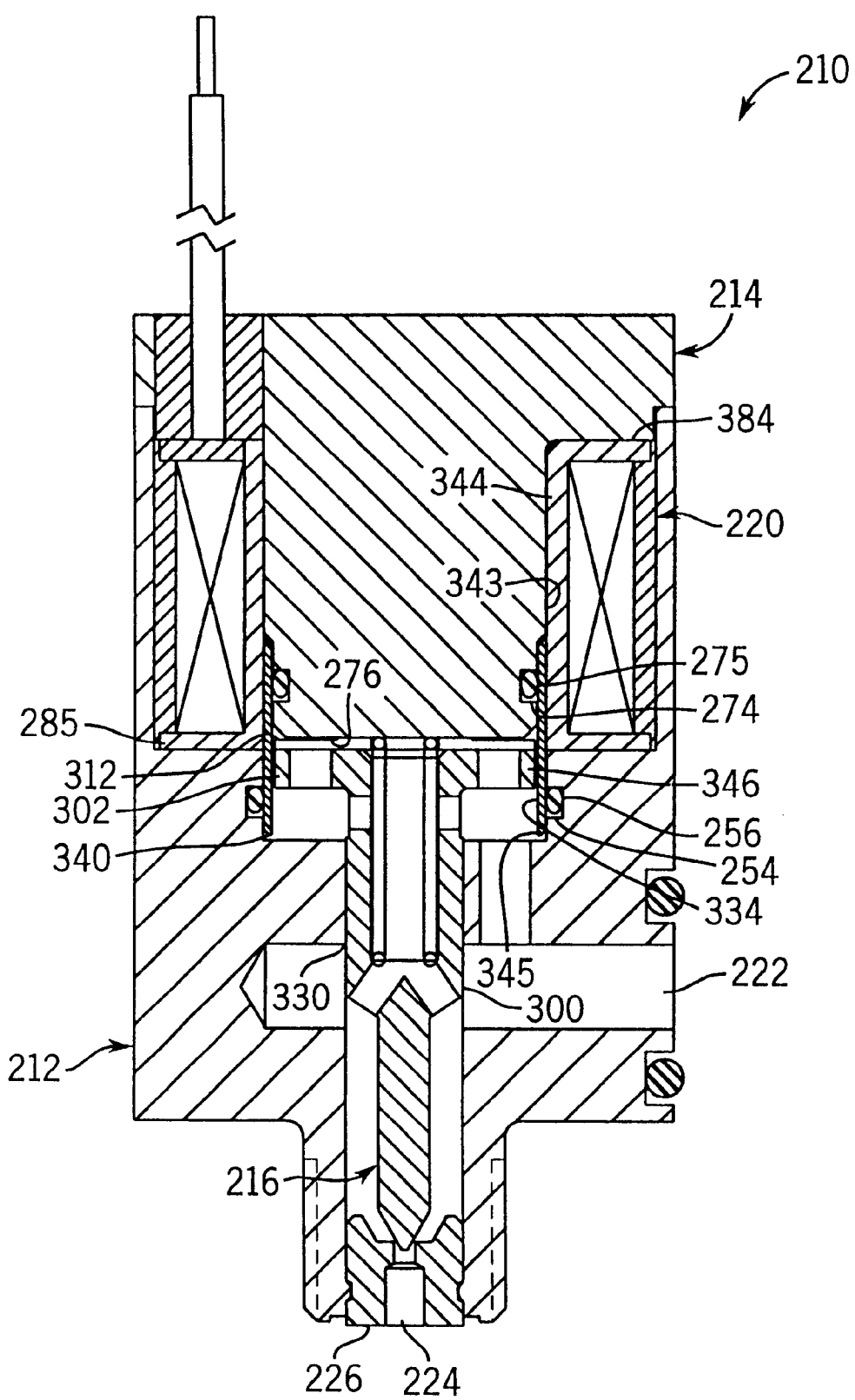
FIG. 19 is a vertical section view of a second embodiment of a valve provided by the invention.

Referring to FIG. 19, in accordance with a further embodiment of the invention, a valve 210 for dispensing viscous fluids includes a valve body 212, a pole piece 214, an armature 216 a solenoid coil 220 and an isolation sleeve 340. The armature 216 is stepped in a manner similar to armature 16, defining a larger diameter portion 302 and a smaller diameter intermediate portion 300. The valve 210 is generally similar to valve 10 described above with reference to FIGS. 1–18, and accordingly, the components of valve 210 have been given the same reference numerals as like or similar elements of valve 10 but with each number increased by "200".

In valve 210, the isolation sleeve 340 is tubular in shape. The isolation sleeve 340 can be of a non-magnetic material or a magnetic material. In one embodiment, the isolation sleeve 340 can extend into the large air gap 334 between the large diameter portion 302 of the armature and the inner surface of the valve body 212. However, the isolation sleeve 340 does not extend into the substantially zero air gap 330 between the intermediate diameter portion 300 of the armature and the inner surface of the valve body 212. One sealing element 275 is located in a groove 274 in a surface of the pole piece 214. A portion of the isolation sleeve 340 is interposed between a surface 343 of the pole piece and the opposing surface 344 of the bobbin 384. Another sealing element 256 is located in a circumferential groove 254 in the valve body 212. A further portion of the isolation sleeve 340 is interposed between a surface 345 of the valve body 212 and an opposing surface 346 of the armature 216. In valve 210, the interface between the pole face 276 and the armature face 312 is located near one end 285 of the bobbin 284 of the solenoid coil 220.

Referring to FIGS. 4, 5, 17 and 18, to describe the operation of the valve 10, it is assumed that, initially, the valve 10 is in the closed condition illustrated in FIGS. 4 and 17. In such condition, the valve member 110 is held in engagement with the valve seat 45, preventing adhesive from flowing out of the valve through the valve outlet.

To operate the valve 10, the solenoid coil 20 is energized by a drive current, generating an electromagnetic field in a magnetic circuit, including the valve body 12, the pole piece 14 and the armature 16, for attracting the armature 16 to the pole piece 14. Some of the flux lines or flux paths for the electromagnetic field are represented by reference numerals 161–163 in FIGS. 17 and 18 for closed and open conditions, respectively, for the valve 10. The solenoid coil 20 produces an electromagnetic field in a magnetic circuit including the valve body 12, the pole piece 14 and the armature 16, for moving the armature against the force of the bias element 118 from the closed position to the open position In one preferred embodiment, a peak and hold type current pulse is used to drive the solenoid coil in the manner known in the art. The drive current can be a current pulse that is approximately one millisecond in duration. The peak portion of the drive current pulse is of sufficient magnitude to generate an electromagnetic field that is capable of moving the armature 16 quickly from its closed position, shown in FIGS. 4 and 17, to the open position shown in FIGS. 5 and 18. The hold portion of the drive current is at a lower level that is sufficient to maintain the armature 16 in its retracted position, with the armature face 112 in contact with the pole face 76.

The temperature of hot melt adhesives typically is about 350° Fahrenheit, which is close to the heat limit rating for the solenoid coil 20. The additional heating due to the temperature of the hot melt adhesive in combination with heating due to the drive current being applied to the solenoid coil, could result in and overheating condition for the solenoid coil. Accordingly, preferably a peak and hold type current is used to drive the solenoid coil 20.

In FIG. 17, a plurality of the flux lines of the electromagnetic field generated by the solenoid coil are indicated generally at 161, 162 and 163, respectively. As is described above, the larger diameter portion 102 of the armature 16 includes a fixed series air gap 134 which is maintained by the coaxial bore portions 37 and 38 of the valve body 12. The smaller diameter portion 100 of the armature 16 maintains contact with the bore portion 38 and acts as a bearing surface between the armature 16 and the valve body 12. There is a small air gap 130 between the armature and bore portion 38.

When the solenoid coil 20 is energized, the armature 16 is drawn toward the pole face 76. Initially, the flux paths are as represented by the lines in FIG. 17. In this condition, initially, the smaller diameter portion 100 of the armature 16 becomes saturated so that most of the electromagnetic flux is directed through the large diameter portion 102 of the armature and through air gap 134, as represented by flux lines 161 and 162. However, a small amount of magnetic flux will pass through the saturated portion 100 of the armature as represented by flux line 163. The magnetic flux causes the armature 16 to be drawn into engagement with the pole piece 14 as shown in FIG. 18. When the drive current decreases during the hold portion of the drive signal, the smaller diameter portion 100 of the armature comes out of saturation, allowing some of the electromagnetic flux, represented by flux line 162, that had been diverted to the large diameter armature portion 102 to pass through the smaller diameter portion 100 of the armature and through the small air gap 130 between the smaller diameter portion of the armature 16 and the valve body 12 as shown in FIG. 18.

Thus, the valve 10 provides two air gaps 130 and 134 along the axial extent of the armature. One air gap 134 is "fixed" at the wide or larger diameter end 102 of the armature 16. The other air gap 130 is substantially zero at the smaller diameter portion 100 of the armature. The lower reluctance provided by the smaller air gap reduces current requirements in the holding condition.

The relationship of the two series air gaps is important for optimizing the pull-in and holding characteristics of the valve 10. The larger diameter portion 102 of the armature 16 provides a higher magnetic force for the initial pull-in or movement of the armature. Upon energization, the smaller diameter portion 100 of the armature 16 reaches saturation and flux lines are forced through the larger diameter section of the armature 16, which assists in producing the relatively high magnetic force that is required for fast operation of the valve. The relatively small series air gap 130 is utilized to provide low holding current for the valve 10 in the energized or open state by providing a near zero series air gap 130.

Thus, the higher amplitude peak current causes a the smaller diameter portion 100 of the armature 16 to become saturated during the peak portion of the peak and hold operating cycle to divert magnetic flux through the non-saturated, larger diameter portion 102 of the armature during the peak portion of the operating cycle. The hold current allows the smaller diameter portion 100 of the armature to become non-saturated during the hold portion of the peak and hold operating cycle. Digressing, the amount of force which can be generated by this type of magnetic circuit is given by the relationship $F=kAB^2$, where A is the area of the coextensive portions of the armature 46 and the magnetic pole piece 14, B is the flux density produced by the solenoid coil 20, and k is a constant. The flux density is proportional to NI which is the product of the number of turns N of the solenoid coil 20 and the applied current I. Thus, the available force F is dependent upon the size relationship between the coaxial diameters "d1" and "d2" of the armature end portion and the pole surface 76 of the magnetic pole piece 14.

The stepped configuration for the armature 16 allows the magnetic force produced to be maximized for a given size valve. Alternatively, for a given value of magnetic force, the number of turns of the solenoid winding 20 in valve 10 provided by the invention can be reduced with an attendant reduction in the size of the solenoid coil 20. Moreover, a reduction in the number of turns for the solenoid winding can provide lower resistance for the solenoid winding. Thus, because of the increased magnetic force provided by valve 10 in accordance with the present invention, ampere turns can be reduced for the solenoid coil 20. That is, either the magnitude of the current or the number of turns of the solenoid winding 82 can be reduced. Reducing the number of turns of the solenoid winding 82 can reduce both the size and the resistance of the solenoid winding.

The operating speed of the valve 10 is also a function of the viscosity of the fluid being dispensed. Higher viscosity fluids require longer operating times for a valve. The valve 10 provided by the invention is best suited for operation at about 3000 to 5000 centipoise. In this range, the valve 10 response time is about twice as fast as that obtainable by known valves used in dispensing hot melt adhesives and other viscous fluids.

In addition, known valves used for dispensing viscous fluids, such as hot melt adhesives, generally include an elongated tube interposed between the armature and the valve body to provide sealing for the fluid chamber. Typically, such sealing tube is non-magnetic. This arrangement produces a disruption in the flux paths between the armature and the valve body, for example, with the non-magnetic sealing tube located in the air gap. The valve 10 is self purging and the interior of the valve is designed to minimize regions where the adhesive could accumulate. Thus, for example, corners in the interior of the valve body 12 are rounded, ect. at locations where adhesive could deposit. In addition, fluid flow paths are established within the valve body 12 to cause the adhesive to be recirculated. This avoids adhesive hardening and forming clumps which could break loose and clog the nozzle 26 in the valve outlet 24.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A valve for intermittently dispensing a viscous fluid, said valve comprising:

a valve body defining a fluid chamber having a fluid outlet;

a fluid inlet for communicating the fluid chamber with a source of the viscous fluid;

a pole piece;

an armature disposed within the fluid chamber for reciprocating movement between first and second positions, the armature having a first end located adjacent to the pole piece and a second end located adjacent to the fluid outlet, said armature preventing fluid flow through said fluid outlet when said armature is in one of said positions and said armature permitting fluid flow through said armature when said armature is moved away from said one position; and a solenoid coil for producing an electromagnetic field in a magnetic circuit including the valve body, the pole piece and the armature, for moving the armature from said first position to said second position, said armature cooperating with said body to define at least first and second air gaps, and said armature being configured and arranged to cause at least a portion of magnetic flux of the electromagnetic field to be diverted from flux paths including the second air gap to the flux paths including first air gap during at least a portion of the operating cycle.

2. The valve according to claim 1, wherein magnetic flux passing through said first air gap provides force for moving the armature from the first position toward the second position, and magnetic flux passing through said second air gap provides a holding for maintaining the armature at said second position.

3. The valve according to claim 1, wherein the first air gap provides a reluctance that is greater than the reluctance provided by said second air gap.

4. The valve according to claim 1, wherein said first and second air gaps are provided along the axial extent of the armature.

5. The valve according to claim 1, wherein the armature includes a first portion having a cross sectional area and a second portion having a cross sectional area that is smaller than the cross sectional area of said first portion.

6. The valve according to claim 1, wherein at least a portion of the magnetic flux is diverted through one of said air gaps.

7. The valve according to claim 1, wherein the width one of said air gaps is larger than the width of the other one of said air gaps.

8. A valve for intermittently dispensing a viscous fluid, said valve comprising:

a valve body defining a fluid chamber having a fluid outlet;

a fluid inlet for communicating the fluid chamber with a source of the viscous fluid;

a pole piece;

an armature disposed within the fluid chamber for reciprocating movement between first and second positions, the armature having a first end located adjacent to the pole piece and a second end located adjacent to the fluid outlet, said armature having a stepped outer diameter including a first portion of a first diameter and a second portion of a reduced diameter, said armature preventing fluid flow through said fluid outlet when said armature is in one of said positions and said armature permitting fluid flow through said armature when said armature is moved away from said one position; and a solenoid coil for producing an electromagnetic field in a magnetic circuit including the valve body, the pole piece and the armature, for moving the armature from said first position to said second position, wherein at least a portion of the second diameter portion of the armature becomes magnetically saturated during a first portion of an operating cycle, causing magnetic flux of said electromagnetic field to be diverted from said portion of the second diameter portion of the armature through said first portion of the armature, and wherein flux paths are established over said first and second portions of the armature during a second portion of the operating cycle.

9. The valve according to claim 8, wherein the armature includes an internal fluid passageway extending from the face of the pole.

10. The valve according to claim 8, wherein the fluid chamber includes a stepped bore.

11. The valve according to claim 8, wherein the pole face is located at one end of the solenoid coil.

12. The valve according to claim 8, wherein said armature includes a plurality of axially extending channels about the outer periphery extending substantially the length of the armature, and a plurality of radial bores communicating the internal fluid passageway of the armature with the axial channels.

13. The valve according to claim 8, wherein the axially extending channels have a substantially rectangular cross section.

14. A valve for intermittently dispensing a viscous fluid, said valve comprising:

a valve body defining a fluid chamber having a first end, a second end, and a fluid outlet near said second end;

a fluid inlet for communicating the fluid chamber with a source of the viscous fluid;

a pole piece having a pole face disposed at said first end of said valve body;

an armature disposed within the fluid chamber for reciprocating movement between first and second positions, the armature including first and second ends, the first end of said armature having an armature face located adjacent to the pole piece, defining an interface between the pole face and the armature face, and the second end of the armature located adjacent to the fluid outlet;

a sealing structure including an isolation sleeve for sealing the fluid chamber at said first end; and a solenoid coil for producing an electromagnetic field for moving the armature between first and second positions, the solenoid coil having first and second ends, wherein the interface between the pole face and the armature face is located adjacent to said first end of said solenoid coil.

15. The valve according to claim 14, wherein said isolation sleeve is of a non-magnetic material.

16. The valve according to claim 14, wherein said pole piece extends within said solenoid coil, and said armature extends within said body.

17. The valve according to claim 16, wherein said isolation sleeve has an axially extending portion and a radially extending portion located adjacent the interface between the pole face and the first end of the armature, said axially extending portion interposed between said solenoid coil and said first end of said pole piece, and said radially extending portion interposed between an inner surface of said body and said first end of said armature.

18. The valve according to claim 17, wherein said sealing structure includes a first seal member interposed between said axially extending portion of said isolation sleeve and said first end of said pole piece adjacent to said first end of said solenoid coil, and a second seal member interposed between said radially extending portion of said isolation sleeve and said first end of said armature adjacent to said first end of said solenoid coil.

19. A valve for intermittently dispensing a viscous fluid, said valve comprising:

a valve body having a stepped axial bore, the valve body having a fluid inlet communicated with the axial bore and a fluid outlet;

a pole piece at one end of the bore;

an armature disposed within the axial bore for reciprocating movement between first and second positions, said armature having a stepped outer diameter including a first armature portion of a first diameter which is located near said pole piece and a second armature portion of a reduced diameter which is located between said pole piece and said fluid outlet;

a solenoid coil for producing an electromagnetic field for moving said armature during an operating cycle;

the second armature portion engaging an inner surface of the axial bore along a first bore portion thereof, and the first armature portion being maintained spaced apart from the inner surface of the axial bore along a second bore portion thereof, and wherein magnetic flux through said second armature portion is diverted to the first armature portion during an initial portion of the operating cycle.

20. The valve according to claim 19, wherein the solenoid coil is energized to produce an electromagnetic field at a first intensity during said initial portion of the operating cycle and to produce an electromagnetic field at a second lower intensity during the balance of the operating cycle.

21. The valve according to claim 19, and including a bias member interposed between the armature and the pole member for returning the armature to one of said positions when the solenoid coil is deenergized.

22. A method for operating a valve intermittently for dispensing a viscous fluid, said method comprising:

supplying the viscous fluid to a fluid chamber having a fluid outlet;

positioning an armature within the fluid chamber for reciprocating movement between first and second positions to move an end of the armature into and out of engagement with the outlet;

energizing a solenoid coil to produce an electromagnetic field for moving the armature from a first position to a second position during an operating cycle;

causing a first portion of the armature to become saturated during at least a first portion of the operating cycle to divert magnetic flux of the electromagnetic field through a second nonsaturated portion of the armature during said portion of the operating cycle;

allowing said first portion of the armature to become non-saturated during a second portion of the operating cycle.

23. The method according to claim 22, wherein causing a first portion of the armature to become saturated includes driving the first portion with a current at a first level to saturate the first portion, and wherein allowing the first portion to become nonsaturated includes driving the first portion of the armature with a current at a second lower level during said second portion of the operating cycle.

* * * * *